Feb. 27, 1934.　　　A. McMICKLE　　　1,948,932
MEASURING NONSPILLING CREAMER ATTACHMENT FOR COFFEE CUPS
Filed Sept. 16, 1930

Inventor
Alda McMickle
By H. Geisler
Attorney

Patented Feb. 27, 1934

1,948,932

UNITED STATES PATENT OFFICE 1,948,932

MEASURING NONSPILLING CREAMER ATTACHMENT FOR COFFEE CUPS

Alda McMickle, Redmond, Oreg.

Application September 16, 1930
Serial No. 482,199

2 Claims. (Cl. 65—65)

In many localities the law, or ordinances, require that in serving coffee in a public place of refreshment, a prescribed minimum quantity of cream be served with the coffee; therefore the cream container must initially be filled by the use of some measure with the prescribed minimum.

In serving cream with coffee, in public places of refreshment, the service must frequently be carried to a service table, and, in order to avoid waste in the undue use of cream, the latter is usually served in a small pitcher. This gives occasion of upsetting the cream pitcher, or spilling out some of it in carrying to the guest.

Besides, to avoid any contention as to the quantity of cream served, it is desirable to provide a creamer, that is a cream container, which in itself will provide an indication that the quantity of cream served is not less than the minimum quantity prescribed, and further is so constructed as to tend to prevent the spilling of cream in carrying to the service table, so that only ordinary care is required by the waiter in carrying the refreshments.

It is further convenient to provide the creamer with some simple means by which to affix the same on the rim of the coffee cup. This not only economizes the space required on the tray, but also renders the serving of coffee and cream more convenient.

The object of my invention is therefore to provide a creamer which embodies the following features:

Simple means for indicating that the quantity of cream which the creamer holds is the full minimum quantity the regulation prescribes; means for affixing and carrying the creamer on the rim of a coffee cup; the latter means to be especially adapted to enable the affixing of the creamer on, and removal from the rim of the coffee cup conveniently and readily; these affixing means being further adapted to hold the creamer firmly on the rim of the coffee cup against swaying, thus preventing spilling in carrying the coffee to the place of service; and the top of the creamer further being adapted to deflect any waves, caused by the carrying of the creamer, back into the creamer.

I attain my object by providing a container for the cream to be served with the coffee cup, which container is provided with a band-like clamp made of thin springy material, the opposed interior faces of the clamp being concaved and convexed respectively, so that said faces conform transversely substantially with a segment of the circle represented by the rim of the coffee cup; and in order to indicate full measure of a given quantity of cream to be contained in the creamer, I locate the top of the clamp to touch a plane which on the interior of the creamer represents said full measure, and thus constitutes a measuring gage.

Furthermore, to prevent spilling of the cream in carrying of the cream to the place of service, the top of the creamer is curved inward toward the top to lesser diameter than the main body of the creamer.

The above mentioned features of my invention are hereinafter more fully described, with reference to the accompanying drawing.

Figure 1:
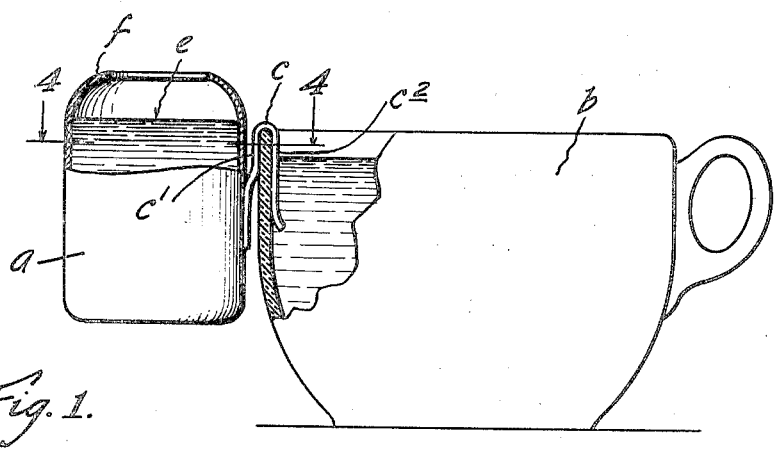
Fig. 1 represents a sectional elevation of a coffee cup and creamer, the latter embodying the features of my invention.
Figures 2, 3:
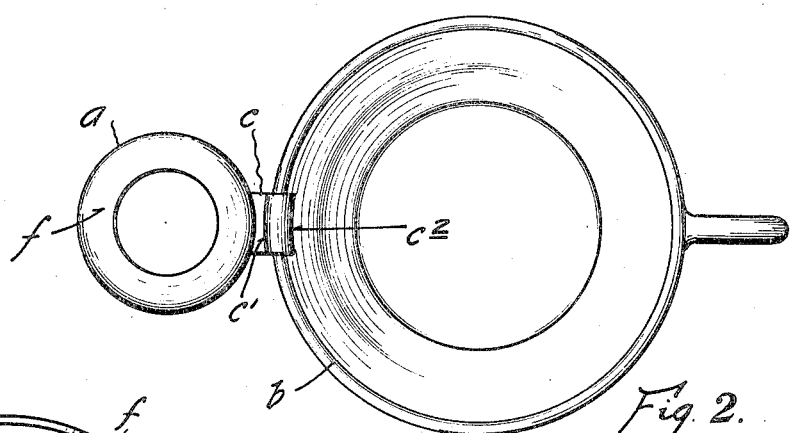
Fig. 2 shows a top or plan view of the coffee cup and creamer as shown in Fig. 1.
Fig. 3 shows a perspective elevation, on a larger scale of my creamer by itself.
Figure 4:
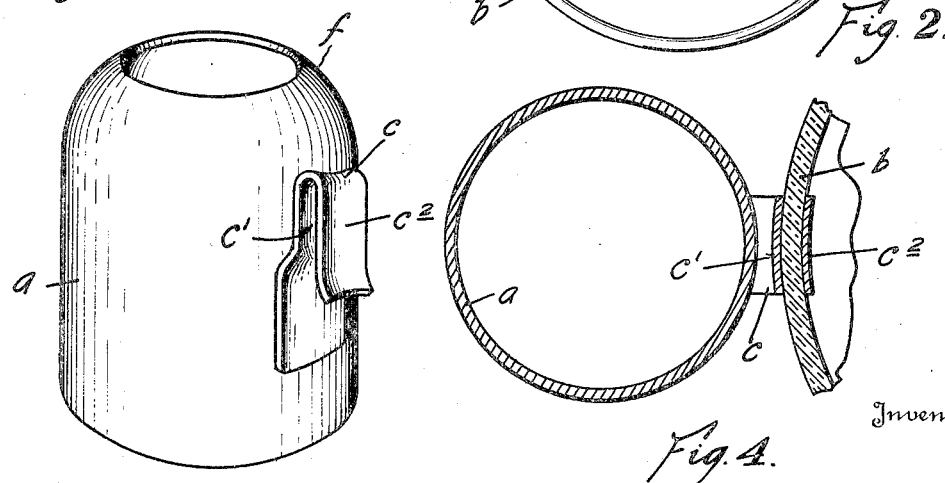
Fig. 4 shows a transverse section of Fig. 1 on the line 4—4, but on a larger scale, bringing out more clearly certain features of construction of my invention.

My creamer $a$ is affixed on the rim of the coffee cup $b$ in the manner illustrated by Fig. 1, the creamer preferably for convenience is constructed of metal. It is provided with a band-like clamp $c$ preferably made of springy metal and the interior faces of the legs $c'$, $c2$, as more clearly shown by Figs. 3 and 4, being respectively concaved and convexed, so that said faces conform transversely substantially with a segment of the circle represented by the rim of the coffee cup. In order to indicate that the creamer contains the full measure of the quantity of cream prescribed by any law or ordinance, I so locate the clamp $c$ that the top thereof touches a plane as $e$, which on the interior of the creamer represents said full measure, and thus the top of the clamp $c$ constitutes a measuring gauge.

In order to prevent spilling of the cream while serving the coffee, the top of the creamer is curved inward toward the top to a lesser diameter than the main body of the creamer as indicated at $f$, whereby to adapt the walls of the creamer at the top to deflect back into the creamer any waves produced on the surface of the cream by the carrying of the creamer to the place of service.

I claim:

1. A creamer attachment for coffee cup and the like, comprising a container provided at one side with means for affixing on the rim of a cup, such means adapted to hold the container against rocking laterally, said affixing means further adapted to indicate that plane of the interior of the container which assures a full measure of a given quantity and the top of the container being contracted and curved inward towards the rim, thereby to reflect back into the container any waves induced on the surface of its contents.

2. A creamer attachment for coffee cup and the like, comprising a container provided at one side with an offset handle consisting of a strip of thin springy metal bent back on itself, the inner opposed faces of the strip being concaved and convexed respectively, whereby the handle is adapted to be affixed on the rim of a cup and holds the container against rocking laterally, the top of said handle being located to touch that plane of the interior of the container which assures a full measure of a given quantity and the top of the container being contracted and curved inward towards the rim, thereby to reflect back into the container any waves induced on the surface of its contents.

ALDA McMICKLE.